(12) United States Patent
Teuwen et al.

(10) Patent No.: US 9,411,597 B2
(45) Date of Patent: Aug. 9, 2016

(54) RETURN-ORIENTED PROGRAMMING AS AN OBFUSCATION TECHNIQUE

(71) Applicant: NXP B.V., Eindhoven (NL)

(72) Inventors: Philippe Teuwen, Etterbeek (BE); Peter Rombouts, Sint-Katelijne-Waver (BE); Jan Rene Brands, Nijmegen (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 49 days.

(21) Appl. No.: 14/270,558

(22) Filed: May 6, 2014

(65) Prior Publication Data

US 2015/0324585 A1    Nov. 12, 2015

(51) Int. Cl.
| | |
|---|---|
| G06F 21/00 | (2013.01) |
| G06F 9/38 | (2006.01) |
| G06F 21/56 | (2013.01) |
| G06F 9/44 | (2006.01) |
| G06F 21/14 | (2013.01) |

(52) U.S. Cl.
CPC .. *G06F 9/38* (2013.01); *G06F 8/70* (2013.01); *G06F 21/14* (2013.01); *G06F 21/56* (2013.01); *G06F 2221/033* (2013.01)

(58) Field of Classification Search
CPC ......... G06F 21/14; G06F 21/10; G06F 21/54; G06F 21/56; G06F 8/70; G06F 2221/033; H04L 2209/16
USPC .......................................................... 726/22
See application file for complete search history.

(56) References Cited

U.S. PATENT DOCUMENTS

| | | | | |
|---|---|---|---|---|
| 7,555,780 | B2 * | 6/2009 | Tucker | G06F 21/14 726/26 |
| 2005/0175180 | A1 * | 8/2005 | Venkatesan | H04L 1/0057 380/268 |
| 2007/0039048 | A1 * | 2/2007 | Shelest | G06F 21/566 726/22 |
| 2009/0320129 | A1 | 12/2009 | Pan et al. | |
| 2011/0041183 | A1 | 2/2011 | Myles et al. | |
| 2012/0030758 | A1 | 2/2012 | van den Berg et al. | |

(Continued)

FOREIGN PATENT DOCUMENTS

WO        99/01815        1/1999

OTHER PUBLICATIONS

Pappas, Vasilis et al.; "Smashing the Gadgets: Hindering Return-Oriented Programming Using in-pace Code Randomization"; 15 pgs; 2012.

(Continued)

*Primary Examiner* — Yogesh Paliwal

(57) ABSTRACT

A method for obfuscating functionality of computer software is disclosed. In an embodiment, the method involves determining a first set of instructions needed to perform a target operation and a second set of instructions for at least one or more additional operations. The second set of instructions is tuned to contain instructions such that, by executing the second set of instructions, the function of the first set of instructions can be performed. Once the first and second sets of instruction are determined and tuned, a code library is created and code fragments in the library correspond to code needed to perform the function of the first set of instructions when executed. Instructions are then added to the second set of instructions such that, when executed, will cause the functionality of the first set of instructions to be achieved.

20 Claims, 6 Drawing Sheets

(56) References Cited

U.S. PATENT DOCUMENTS

2013/0179869 A1 7/2013 Little et al.
2013/0232578 A1* 9/2013 Chevallier-Mames .. G06F 21/10
726/26

OTHER PUBLICATIONS

Cheng, Yueqiang et al.; "ROPecker: A Generic and Practical Approach for Defending Against ROP Attacks"; NDSS '14, Feb. 23-26, 2014, San Diego, CA, USA; pp. 1-14; 2014.
Bletsch, Tyler et al.; "Jump-Oriented Programming: A New Class of Code-Reuse Attack"; ASIACCS '11, Mar. 22-24, 2011, Hong Kong, China; 10 pgs.; 2011.
Checkoway, Stephen et al.; "Return-Oriented Programming without Returns"; CCS'10, Oct. 4-8, 2010, Chicago, Illinois, USA; pp. 1-14; 2010.
Mohan, Vishwath et al.; "Frankenstein: Stitching Malware from Benign Binaries"; 8 pgs.; 2012.
Roemer, Ryan et al.; "Return-Oriented Programming: Systems, Languages, and Applications"; ACM Transactions on Information and System Security—TISSEC; pp. 1-36; Mar. 2012.
Extended European Search Report for Patent Appln. No. 15166386.1 (Sep. 1, 2015).
"Return-Oriented Programming", Internet Archive, Wikipedia, 5 pgs, retrieved from the internet on Feb. 24, 2016 at: https://web.archive.org/web/20140427041621/http://en.wikipedia.org/wiki/Return-oriented_programming (archive from Apr. 27, 2014).
"Obfuscation (Software)", Internet Archive, Wikipedia, 7 pgs, retrieved from the internet on Feb. 24, 2016 at: https://web.archive.org/web/20140219082644/http://en.wikipedia.org/wiki/Obfuscation_(software) (archive from Feb. 19, 2014).
Mohan, V. et al. "Frankenstein: Stitching Malware from Benign Binaries", WOOT '12 (6th USENIX Workshop on Offensive Technologies) (Aug. 6, 2012), pp. 77-84, retrieved from the internet at: http://www.utdallas.edu/~hamlen/mohan12woot.pdf.

* cited by examiner

RETURN-ORIENTED PROGRAMMING AS AN OBFUSCATION TECHNIQUE

Attempts to hijack the operation of a computer program and efforts to protect against hijacking attacks have developed into an arms race between increasingly sophisticated attacks and programming methods developed to prevent or respond to the attacks. One current technique for preventing hijacking attacks is to mark addresses in memory as either executable addresses or data addresses. Attacks typically involve introducing attacker-generated code into addresses in memory and then diverting the flow of control to those memory addresses. By limiting user writes to data addresses while only permitting the execution of executable addresses, a program will not execute code found in a data address. Thus, attacker-introduced code will not be executed.

However, return-oriented programming (ROP) overcomes the defense offered by limiting which addresses can be executed because the code used to hijack a program is code that the program being hijacked executes and, therefore, the code is guaranteed to be located in memory marked as an executable address. ROP is a code-reuse style attack in which the attacker takes control of the stack and causes the arbitrary execution of short code sequences (gadgets) found within a program's existing binaries. A good analogy is a journalist misquoting a politician. A politician might say "never will I support such a reform," but the journalist might quote the politician as having said "I support such a reform." By beginning the quote two words in, the meaning of the quote completely changes. Similarly, by taking control of the stack and diverting control of a program so that the program jumps to the middle of an instruction already existing within a program, the function of the program can be completely changed without having to introduce any new code into the program.

Typically, ROP uses gadgets that end with a return statement. By using return instructions, a hijacker can cause the program to execute instructions in an arbitrary order not intended by the program. Finding gadgets that will end with a return statement is often made easier by the high density of various instruction encodings because the same bytes used to represent one instruction can represent a second instruction when parsed differently (e.g., in x86, "0f 95 45 C3" represents "setnzb-61(% ebp)" while "95", "45", "C3" represents "xchg % ebp, % eax", "inc % ebp", "ret" respectively).

Because ROP uses the code of the program against the program, ROP-based hijacking attacks are very difficult to prevent. Various existing solutions for preventing ROP-based hijacking attacks involve compiling the code in a manner that minimizes the possibility of finding gadgets within the code. However, such solutions, at best, only discourage ROP-based hijacking attacks and the functionality of the program is still apparent. Thus, a solution that does more than discourage ROP-based hijacking attacks is needed.

In an embodiment, a method for obfuscating functionality of computer software is disclosed. The method involves determining a first set of instructions needed to perform a target operation and determining a second set of instructions for at least one or more additional operations. The second set of instructions is tuned to contain instructions such that, by executing the second set of instructions, the function of the first set of instructions can be performed. Once the first and second sets of instruction are determined and tuned, a code library is created that is made up of code fragments from the second set of instructions. The code fragments in the library correspond to code needed to perform the function of the first set of instructions when executed. Instructions are added to the second set of instructions that, when executed, will cause the computer software to execute instructions from the code library and perform the function of the target operation. Thus, when the second set of instruction is then executed, the functionality of the first set of instructions and the second set of instructions is achieved.

In a second embodiment, a computer system, having a processor and memory, is configured to determine a first set of instructions needed to perform a target operation and to then determine a second set of instructions for at least one or more additional operations. The second set of instructions are then tuned to contain instructions such that, by executing the second set of instructions, the function of the first set of instructions can be performed and a code library comprising code fragments from the second set of instructions is created wherein, the code fragments correspond to code needed to perform the function of the first set of instructions. Instructions are then added to the second set of instructions such that, when executed, the program modifies a stack used by computer software to execute instructions from the code library such that the stack executes instructions in an order that will perform the function of the target operation.

In a third embodiment, a non-transitory computer readable storage medium containing program instructions for obfuscating program functionality is disclosed. The program instructions cause the one or more processors to perform steps including determining a first set of instructions needed to perform a target operation, determining a second set of instructions for at least one or more additional operations. The instruction then cause the one or more processors to tune the second set of instructions to contain instructions such that, by executing the second set of instructions, the function of the first set of instructions can be performed, create a code library comprising code fragments from the second set of instructions wherein the code fragments correspond to code needed to perform the function of the first set of instructions, and add instructions to the second set of instructions to modify a stack used by a computer software to execute instructions from the code library such that the stack executes instructions in an order that will perform the function of the target operation.

Other aspects and advantages of embodiments of the present invention will become apparent from the following detailed description, taken in conjunction with the accompanying drawings, illustrated by way of example of the principles of the invention.

FIG. 1A depicts a portion of a byte stream.

FIG. 1B depicts the byte stream of FIG. 1A beginning at a different offset.

Throughout the description, similar reference numbers may be used to identify similar elements.

Figure 2:
FIG. 2 is a block diagram of computer memory in a computing device in which the byte streams of FIGS. 1A and 1B can be stored during execution.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

FIG. 1A depicts a byte stream in accordance with an embodiment of the invention. The byte stream is made up of words, which can be of many types including, for example, opcodes, integer constants, register numbers, constant pool references, and branch offsets. In FIG. 1A, the words within the black box 102, when parsed, perform a series of instructions. FIG. 1B depicts the same byte stream as in FIG. 1A beginning at a different offset as indicated by the black box 104. Parsing the words in the black box of FIG. 1B will result in different instructions than those parsed from the black box in FIG. 1A and could cause words to be read as different types (e.g., an integer constant read as an opcode). Thus, by parsing a byte stream from different offsets, different instructions and functions can be executed or performed from the same byte stream. Using this concept, the byte stream of a program can be used to cause a program to execute unintended instructions or perform unintended functions.

FIG. 2 depicts a block diagram of computer memory in a computing device in which the byte streams in FIGS. 1A and 1B can be stored during execution. As depicted in FIG. 2, the computer memory is allocated to store data from the following categories in the following order: a stack, memory mappings, a heap, uninitialized variables, initialized variables, and program code. Thus, when the memory is popped (accessed in a top-down manner) the stack will be accessed first. Although a computing device will typically allocate memory for all of the above-listed categories, ROP focuses on memory allocated for the stack and the program code.

Data stored in the stack portion of the memory (the stack) facilitates the flow of a computer program and to store local variables during the performance of a sub-routine. For example, when a main body of a computer program is executed, instructions are performed until a jump instruction is reached. Then, the address of the instruction following the jump instruction (return address) is pushed onto the stack and the program jumps to the instruction specified by the jump instruction and performs a sub-routine of which the specified instruction is a part. During the performance of the sub-routine, local variables can be pushed to and popped from the stack and, at the end of the sub-routine, a value is popped from the stack and the flow of the program is directed back to the address at that value. Typically, all variables pushed to the stack during the performance of the sub-routine are popped from the stack. Thus, the value popped from the stack at the end of the sub-routine is the return address. However, by leaving or adding extra values on the stack, the flow of the program can be diverted.

Attackers can add extra values to the stack by exploiting a defect in the code of a program. For example, a common technique is called stack buffer overflow and occurs when a program writes to a memory address within memory allocated to the stack. For example, if a variable stored on the stack is only expecting 16 bits but is given 32 bits, then the additional 16 bits may be written into adjacent memory space on the stack (e.g., space previously holding the return address). By exploiting a defect (e.g., passing 32 bits to a 16 bit variable) and overwriting addresses on the stack, an attacker can cause a program to perform a specified operation not intended by the program.

Figure 3:
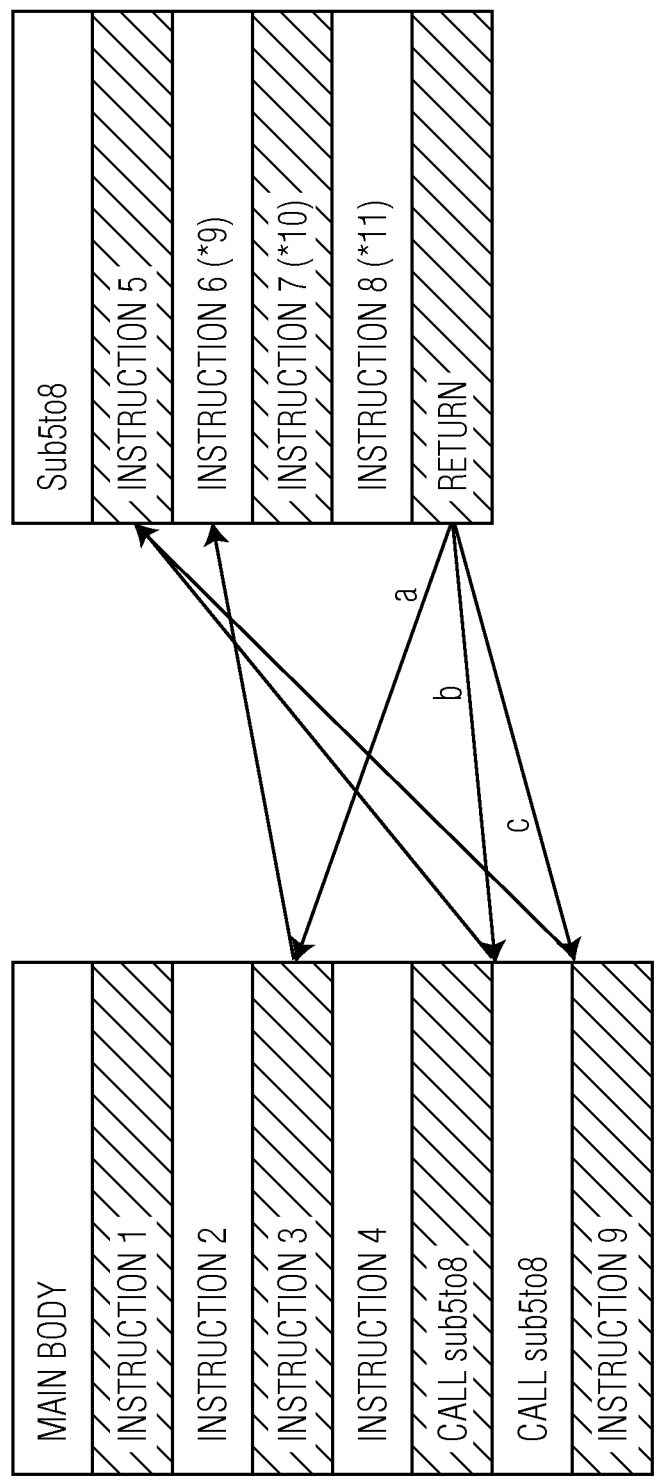
FIG. 3 illustrates execution of a computer software program with a portion of the program obfuscated in accordance with an embodiment of the invention.

Typically, the specified operation to be performed and the defect in the program code are specified and exploited by an attacker. Alternatively, in accordance with the invention, the operation and the defect can be specified and exploited by the program itself In this way, a program can cause part of its operations to be performed by ROP, thus, obfuscating the parts of the program performed by ROP. FIG. 3 illustrates a computer software program with a portion of the program obfuscated in accordance with an embodiment of the invention. The computer software program, without ROP techniques, would have a main body and two subroutines (sub5to8 and sub9to11). With ROP techniques, in accordance with an embodiment of the invention, sub9to11 can be obfuscated within sub5to8. For example, referring to the byte streams from FIGS. 1A and 1B, sub5to8 could be the byte stream boxed in FIG. 1A (0f9545c3) and sub9to11 could be the byte stream boxed in FIG. 1B (9545c3). Thus, jumping to an offset within sub5to8 would result in the byte stream of sub9to11.

FIG. 3 illustrates execution of the computer software program using one subroutine (Sub5to8). In accordance with an embodiment of the invention, sub5to8 is tuned so that the functionality of sub9to11 can be performed by instructions found within sub5to8. When the program is executed, the first 4 instructions are performed. Then, the program flow shifts to sub5to8 and instructions 5-8 are performed. By beginning the subroutine at instruction 5 (i.e., non-obfuscated operation) the apparent function of sub5to8 is performed. However, sub5to8 contains instructions that exploit an intentional defect in the program and modify the stack of the program. Thus, when the program pops the stack when performing the return instruction, the program flow shifts to the middle of Instruction 3 (return path a) and begins parsing words in the instruction. Parsing the words forms a jump instruction that directs the flow of the program to Instruction 6 in sub5to8 and instructions 6-8 (i.e., the obfuscated function) will be performed before a jump (e.g., a return instruction) is reached. Instructions 6-8 perform the same function as Instructions 9-11 in sub9to11 and by causing the program to begin performing instructions within the subroutine at a different instruction (i.e., Instruction 6 instead of Instruction 5) the functionality of sub9to11 is obtained from instructions in sub5to8. That is, the functionality of sub5to8 and sub9to11 are both obtained from instructions in sub5to8. In an alternative embodiment, the stack is modified so that when the program pops the stack, the program flow shifts directly to instruction 6 without using the intermediate jump in instruction 3. However, in an embodiment, using an intermediate jump can allow for the execution of additional instructions. After Instructions 6-8 are performed the program flow shifts back to the main body of the program (return path b) and "Call sub5to8" is performed. This time, when the defect is exploited, the stack is not modified so the program flow again shifts back to the main body of the program (return path c) and performs Instruction 9 of the main body of the program (as distinct from Instruction 9 in sub9to11). Thus, the functionality of the program is obfuscated because the functionality of sub9to11 is not apparent in the code of the computer software program, yet the functionality of the subroutine is still achieved.

Figure 4:
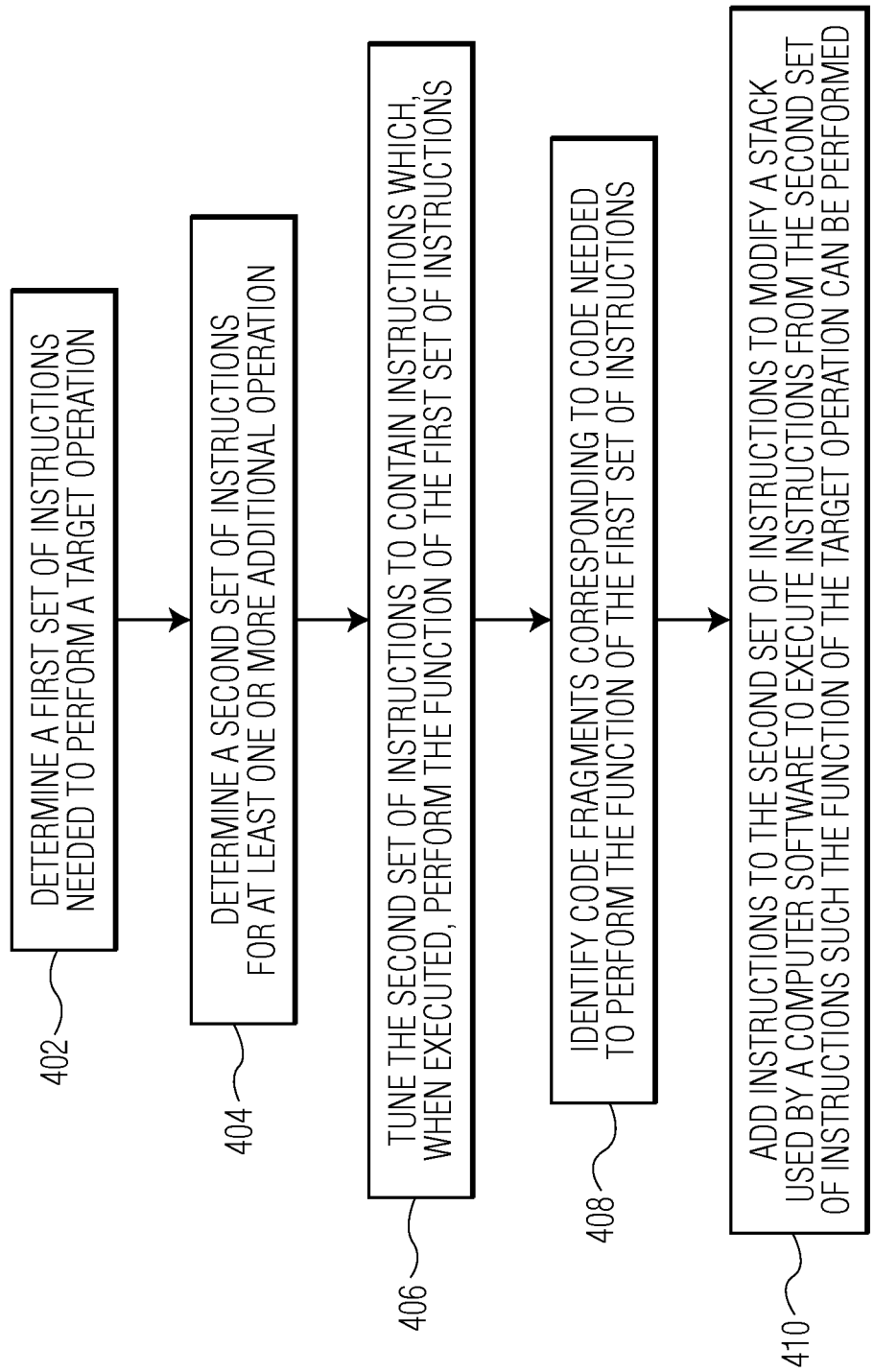
FIG. 4 is a process flow diagram of a method for obfuscating functionality of computer software in accordance with an embodiment of the invention.

FIG. 4 is a process flow diagram of a method for obfuscating functionality of computer software. At block 402, a first set of instructions needed to perform an operation of the program is determined. At block 404, a second set of instructions is also determined. The second set of instructions can be instructions for one or more operations. At block 406, the second instruction set is tuned such that gadgets needed to perform the function of the first set of instructions are easily found within the byte stream of the second instruction set. In an embodiment, an instruction set can be tuned by adding artificially small functions to the set of instructions, by adding dummy code that looks like obfuscated code or by organizing instructions in the byte stream, by using code in data memory for instructions, or by other known methods for modifying or adding to the instructions in a program. An example of an artificially small function would be replacing a string manipulation with multiple character manipulations. An example of dummy code would be code for an operation not used by the program or code that is intentionally overly complex. An example of organizing instructions in the byte stream would be compiling a program so that instructions in the resulting executable are loaded into the memory in an order that produces gadgets typically needed for return-oriented programming. An example of using code in data memory for instructions would be directing the flow of a program to a data address and allowing the execution of code stored at that data address.

At block 408, the code fragments corresponding to code needed to perform the function of the first instruction set are found within the second instruction set. In an embodiment, the code fragments correspond to code needed for the functionality of the first instruction set, but may not form the same instructions as the first instruction set. At block 410, the second instruction set is modified to direct the program to exploit a defect (intentionally added to the program or accidently occurring) in the program to modify the stack so call the instructions identified at block 408 can be performed such that that the function of the target operation can be performed.

Using gadgets and ROP to perform a function of a target operation presents difficulty because the addresses to gadgets must be injected onto the stack as discreetly as possible or else the obfuscation of the computer program will be diminished. To facilitate discreet injection, an intentional bug or defect can be added to the program code that is only accessible to internal inputs and inaccessible to a real attacker. Thus, because the bug is internal, the write commands sent to the stack via the bug will not be visible to an outside user (e.g., an attacker) and the addresses of needed gadgets will be discreetly injected onto the stack. Additionally, once the address of the first gadget is pushed onto the stack, subsequent gadgets can push addresses of needed gadgets onto the stack without using the bug.

Figure 5:
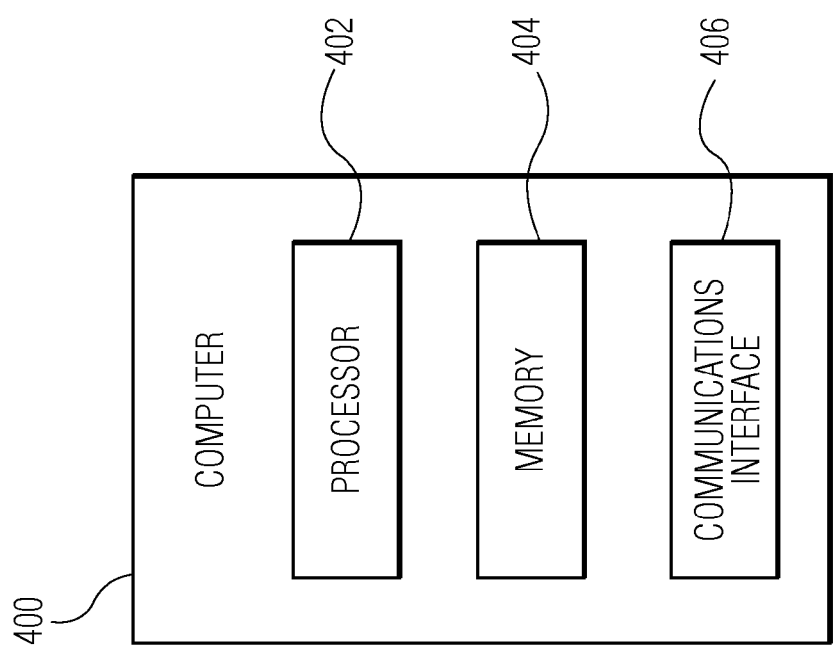
FIG. 5 is a block diagram of a computing device in which a program can be obfuscated using return-oriented programming in accordance with an embodiment of the invention.

FIG. 5 is a computing device in which a program can be obfuscated using return-oriented programming. The computing device includes a processor, memory, and a communications interface. The computer code to be obfuscated can be stored in the memory in a manner similar to the memory discussed above with reference to FIG. 2. The obfuscation processes described above is then performed by the processor in response to inputs from the communications interface.

Although the operations of the method(s) herein are shown and described using return instructions, the methods can be extended to similar branch instructions such as pop and jump instructions, a return in the middle of another opcode, and jump instructions. Additionally, although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for obfuscating functionality of computer software, the method comprising:
   determining a first set of instructions needed to perform a target operation;
   determining a second set of instructions for at least one or more additional operations;
   tuning the second set of instructions to contain instructions, such that, by executing the second set of instructions, the function of the first set of instructions can be performed;
   creating a code library comprising code fragments from the second set of instructions, the code fragments corresponding to code needed to perform the function of the first set of instructions when executed; and
   adding instructions to the second set of instructions to modify a stack used by a computer software to execute instructions from the code library such that the stack executes instructions in an order that will perform the function of the target operation.

2. The method of claim 1, wherein the code fragments in the code library contain jump instructions.

3. The method of claim 1, wherein the second set of instructions is tuned to contain artificially small functions.

4. The method of claim 1, wherein the second set of instructions is tuned to contain dummy instructions.

5. The method of claim 1, wherein the code library further includes code fragments from data segments of the computer software.

6. The method of claim 1, wherein creating the code library comprises including code fragments from shared libraries.

7. The method of claim 1, wherein the second set of instructions is tuned to include a defect, wherein the defect is accessible by internal input to modify the stack.

8. The method of claim 7, wherein executing the second set of instructions comprises exploiting the defect to write outside of the boundaries of an array in which the stack is implemented.

9. The method of claim 7, wherein modifying the stack comprises:
   determining a function that will overflow the stack;
   performing the function on the defect in the computer software, wherein performing the function causes the stack to overflow and re-write addresses on the stack.

10. The method of claim 1, wherein code fragments performed can further modify the stack.

11. The method of claim 1, wherein tuning the second set of instructions further comprises ordering the instructions in view of the first set of instructions such that the addresses of instructions in the second set of instructions correspond to addresses addressed by the code fragments in the code library.

12. The method of claim 1, wherein performing the target operation produces a message, image, or file that is obfuscated during execution of the second set of instructions.

13. A computer system comprising:
   one or more processors; and
   a memory configured to store program instructions, which when executed by the one or more processors causes the one or more processors to perform steps of:
   determining a first set of instructions needed to perform a target operation;
   determining a second set of instructions for at least one or more additional operations; and
   tuning the second set of instructions to contain instructions such that, by executing the second set of instructions, the function of the first set of instructions can be performed;
   creating a code library comprising code fragments from the second set of instructions, the code fragments corresponding to code needed to perform the function of the first set of instructions;
   adding instructions to the second set of instructions to modify a stack used by a computer software to execute instructions from the code library such that the stack executes instructions in an order that will perform the function of the target operation.

14. The computer system of claim 13, wherein the code fragments in the code library contain jump instructions.

15. The computer system of claim 13, wherein the second set of instructions is tuned to contain at least one of artificially small functions, dummy instructions, code fragments from data segments of the computer software, code fragments from shared libraries, and a defect accessible by internal input by which the stack can be modified.

16. The computer system of claim 13, wherein the second set of instructions comprises exploiting the defect to write outside of the boundaries of an array in which the stack is implemented.

17. A non-transitory computer readable storage medium containing program instructions for obfuscating program functionality, wherein execution of the program instructions by one or more processors causes the one or more processors to perform steps comprising:
   determining a first set of instructions needed to perform a target operation;
   determining a second set of instructions for at least one or more additional operations;
   tuning the second set of instructions to contain instructions such that, by executing the second set of instructions, the function of the first set of instructions can be performed;
   creating a code library comprising code fragments from the second set of instructions, the code fragments corresponding to code needed to perform the function of the first set of instructions when executed; and
   adding instructions to the second set of instructions to modify a stack used by a computer software to execute instructions from the code library such that the stack executes instructions in an order that will perform the function of the target operation.

18. The non-transitory computer readable storage medium of claim 17, wherein the code fragments in the code library contain jump instructions.

19. The non-transitory computer readable storage medium of claim 17, wherein the second set of instructions is tuned to contain at least one of artificially small functions, dummy instructions, code fragments from data segments of the computer software, code fragments from shared libraries, and a defect accessible by internal input by which the stack can be modified.

20. The non-transitory computer readable storage medium of claim 17, wherein the second set of instructions comprises exploiting the defect to write outside of the boundaries of an array in which the stack is implemented.

* * * * *